United States Patent
Voois et al.

(10) Patent No.: US 7,035,935 B1
(45) Date of Patent: Apr. 25, 2006

(54) COMMUNICATIONS SERVICE PROVIDER NETWORK

(75) Inventors: Paul A. Voois, Sunnyvale, CA (US); Frederic Artru, Montreal (CA)

(73) Assignee: 8×8, Inc., Santa Clara, CA (US)

( * ) Notice: Subject to any disclaimer, the term of this patent is extended or adjusted under 35 U.S.C. 154(b) by 582 days.

(21) Appl. No.: 09/880,706

(22) Filed: Jun. 13, 2001
(Under 37 CFR 1.47)

Related U.S. Application Data

(60) Provisional application No. 60/212,159, filed on Jun. 16, 2000.

(51) Int. Cl.
*G06F 15/173* (2006.01)

(52) U.S. Cl. ................. 709/238; 379/221.06; 370/260; 719/315; 719/330

(58) Field of Classification Search ........... 379/221.06; 709/238; 719/315, 330; 370/260
See application file for complete search history.

(56) References Cited

U.S. PATENT DOCUMENTS

| | | | |
|---|---|---|---|
| 6,263,064 B1 * | 7/2001 | O'Neal et al. ......... 379/201.03 |
| 6,286,033 B1 * | 9/2001 | Kishinsky et al. .......... 709/203 |
| 6,332,163 B1 * | 12/2001 | Bowman-Amuah ......... 709/231 |
| 6,785,379 B1 * | 8/2004 | Rogers et al. ......... 379/265.02 |

* cited by examiner

*Primary Examiner*—Ahmad F. Matar
*Assistant Examiner*—Quynh H. Nguyen
(74) *Attorney, Agent, or Firm*—Crawford Maunu PLLC; Robert J. Crawford

(57) ABSTRACT

The present invention is directed to a method and system for enhancing the routing of telephony data. According to an example embodiment of the present invention, a telephony private branch exchange routing arrangement is adapted to route IP telephony data. The routing arrangement includes a call-control application having an OOP telephony interface and programmed, using OOP and the OOP telephony interface, to control the routing of calls. A device-control application is adapted to provide telephony communication signals for the routed calls and to interface between the call-control application and a plurality of telephony devices. Configuration information for the call-control application is provided via a configuration manager. In this manner, voice and data networks are effectively fused, allowing the easy integration of computer telephony applications.

44 Claims, 4 Drawing Sheets

COMMUNICATIONS SERVICE PROVIDER NETWORK

RELATED PATENT DOCUMENTS

This nonprovisional application claims priority to, and hereby incorporates, Provisional Application No. 60/212,159, and only to the extent needed for pendency, this is alternatively a conversion of Provisional Application No. 60/212,159, filed on Jun. 16, 2000.

This patent document is related to U.S. patent application Ser. No. 09/005,053, entitled "Videocommunicating Apparatus and Method Therfore", filed on Jan. 1, 1998 (now U.S. Pat. No. 6,124,882), which is a continuation-in-part of U.S. patent application Ser. No. 08/908,826, filed on Aug. 8, 1997 (now U.S. Pat. No. 5,790,712), which is a continuation of U.S. patent application Ser. No. 08/658,917, filed on May 31, 1996 (now abandoned), which is a continuation of U.S. patent application Ser. No. 08/303,973, filed Sep. 9, 1994 (now abandoned), which is a continuation of U.S. patent application Ser. No. 07/838,382, filed on Feb. 19, 1992, (now U.S. Pat. No. 5,379,351). This patent document is further related to U.S. Provisional Patent Application Ser. No. 60/212,220, entitled "Communications System Architecture" and filed on Jun. 16, 2000; to U.S. Provisional Patent Application Ser. No. 60,212,221, entitled "IP Phone Circuit Arrangement and Method" and filed on Jun. 16, 2000; to U.S. patent application Ser. No. 09/597,704, entitled "Communications Controller and Method Therefor" and filed on Jun. 16, 2000, to U.S. Provisional Patent Application Ser. No. 60/211,993, entitled "High Availability IP Telephony" and filed on Jun. 16, 2000; to U.S. Provisional Patent Application Ser. No. 60/212,215, entitled "System Interface Implementation for Hosted iPBX" and filed on Jun. 16, 2000; to U.S. Provisional Patent Application Ser. No. 60,211,992, entitled "IP Telephony Station Equipment" and filed on Jun. 16, 2000; and to U.S. Provisional Patent Application Ser. No. 60,212,219, entitled "iPBX Hosting" and filed on Jun. 16, 2000. All of the above-mentioned documents, as well as the documents appended hereto, are fully incorporated herein by reference.

FIELD OF THE INVENTION

The present invention relates to communication systems, and more particularly, to a programmable communications service provider network and communication methodology.

BACKGROUND OF THE INVENTION

The electronics industry continues to rely upon advances in technology to realize higher-functioning devices at cost-effective prices. For many communication applications, realizing higher-functioning devices in a cost-effective manner requires the creative use of communications channels. Many technologies have been developed that have enhanced communications. Examples include the Internet, facsimile applications, public switched telephone networks (PSTN), wireless telephones, voicemail systems, email systems, paging systems, conferencing systems, electronic calendars and appointment books, electronic address books, and video-image processing systems that communicate video data simultaneously with voice data over a telephones and the Internet. As the popularity of these technologies increases, so does the need to merge and coordinate these technologies in a manner that is convenient and cost-effective for the user.

The above-mentioned technologies have been developed in a relatively isolated manner. Large-scale integration of multiple communications systems has been costly and difficult to achieve and manage. One difficulty stems from the variety of communications channels and data types used for various applications. For example, telephony signals can now be transmitted by methods and systems including traditional publicly-switched telephone networks (PSTN), Internet telephony service providers (ITSP), packet-based systems, digital wireless systems, analog wireless systems, private branch exchanges (PBX), cable systems, T1 systems, integrated service digital network (ISDN), and digital subscriber line (DSL) systems, to name a few. Many telephone systems, particularly for business applications, offer services including voicemail, facsimile, call forwarding, and other call-controls, but these systems are often costly, difficult to manage, limited in scope, and do not offer integration of various communications methods. In addition to difficulties inherent in coordinating telephony-type communications, the coordination of additional communications, such as text, video, or other data, provides additional challenges.

Widespread acceptance and usage of communication systems and services are largely a function of cost and user convenience. Therefore, widespread acceptance and usage of such technology cannot be forced, even when appropriately addressing the marketing needs and overcoming the exorbitant costs of the mass production equipment.

The scalability of a communications system weighs heavily upon the acceptance of the system. As the face of today's workplace is changing, the ability to provide flexible communications services is becoming increasingly important. Many employees are highly mobile, moving between companies and between jobs within a company. When employees are added, leave or move, the communications systems for those employees must be modified. In addition, many employees work from several locations, such as a base office, home, or a branch office. To accommodate ongoing communications needs, a user-friendly and user-reconfigurable system would be advantageous.

As technology advances, traditional distinctions between communications types, such as video, audio, email, and others are breaking down. Wireless telephones and modems are being adapted for Internet use, and Internet telephony communication applications are becoming more viable and even commonplace. For both unsophisticated and sophisticated users of such communication systems and services, the coordination of various communications methods and systems would be beneficial. In addition, it is important to provide scalable, cost-effective, user-friendly control over the communications networks and over the devices that interface with and configure the networks.

SUMMARY OF THE INVENTION

The present invention is directed to a communications method and system adapted for controlling and coordinating various types of communications data in a manner that makes possible the break-down of traditional barriers preventing the integration of communications data types. In addition, the ease of use and cost-effectiveness of the present invention enable the use of such communications control and coordination in small to medium-sized business applications. The present invention is exemplified in a number of implementations and applications, some of which are summarized below.

According to an example embodiment of the present invention, a telephony private branch exchange routing arrangement is adapted to route IP telephony data. The routing arrangement includes a call-control application having an object-oriented programming (OOP) telephony interface and programmed, using OOP and the OOP telephony interface, to control the routing of calls. Telephony communication signals are provided for the routed calls via a device-control application and are used to interface between the call-control application and a plurality of telephony devices. Configuration information for the call-control application and the device-control application is provided via a configuration manager.

According to another example embodiment of the present invention, a programmable communications network is adapted to communicatively couple telephony stations. The network includes a computer server arrangement coupled to a plurality of communications stations communicatively coupled to each other, wherein at least one of the plurality of communications stations is adapted to communicate call-method configuration data. The computer server arrangement includes core configuration data, a call-control application and an IP telephony switch. The call-control application is programmed, using an OOP interface, with the call-method configuration data in combination with the core configuration data. The IP telephony switch is coupled to the communications stations, is responsive to the programmed call-control application and is used for coordinating communication between selected ones of the communications stations.

In still another example embodiment of the present invention, a method is used for providing telephony communications. A configurable IP-based telephony routing system including a router is communicatively coupled to a communications network and adapted to communicate telephony data. The routing system is adapted to send and receive telephony data using IP and analog communication types. Configuration information is provided to the telephony router via an OOP interface, and the router is controlled therefrom. Telephony data is sent from a telephony device to the router via the communications network and is received at the router. Based on the configuration information, the telephony data is routed to another telephony device.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
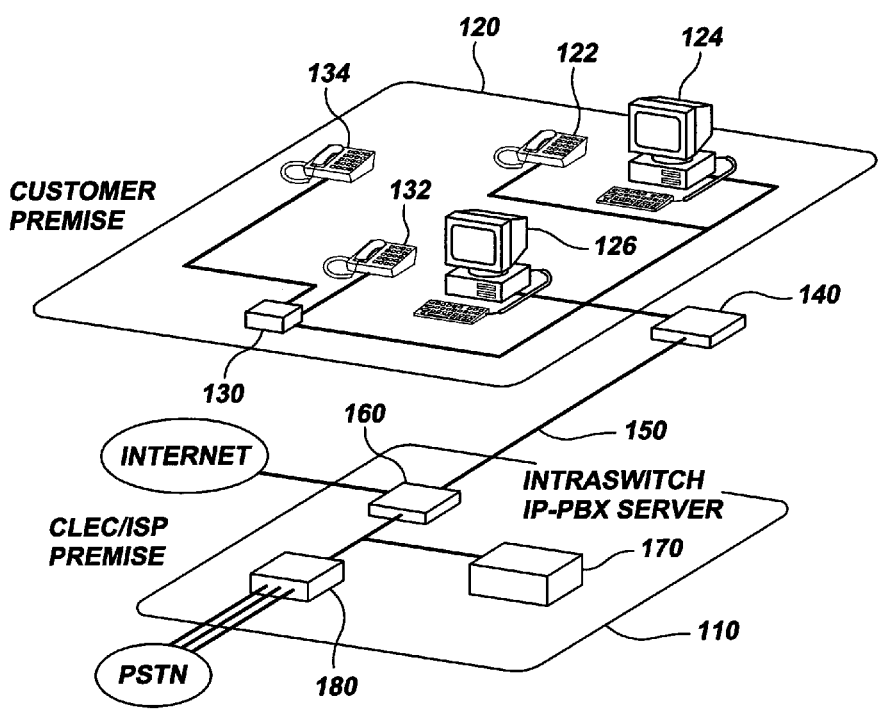
FIG. 1 is a telephone network, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to various types of communications systems, and has been found particularly suited to such systems requiring or benefiting from user-friendly control for processing various telephony communications data types and routing the communications via an Internet protocol (IP) network. While the present invention is not necessarily limited to such systems, various aspects of the invention may be appreciated through a discussion of various examples using this context.

According to an example embodiment of the present invention, a communications service provider network is adapted to receive, process, and deliver communications data of various types using a cost-effective, user-friendly operations platform. The network includes a plurality of communication stations communicatively coupled to one or more communications links. One of the communication stations is adapted to communicate call-method configuration data to a computer server arrangement communicatively coupled to the communications links. The computer server includes core configuration data, a call-control application and an IP telephony switch. The core and call-method configuration data are used in combination to program a call-control application via an object oriented programming (OOP) interface. The IP telephony switch is communicatively coupled to the communications links and coordinates communication between selected ones of the communication stations in response to the programmed call-control application. The use of the IP telephony switch at a service provider, in combination with the OOP interface, provides programming flexibility that enhances the control of telephony communications.

According to a more particular example embodiment of the present invention, the communication network uses a telephony private branch exchange routing arrangement having an OOP-based programming platform and adapted to route IP telephony data. The communications link includes links to the Internet and to a PSTN through a router and an IP/PSTN gateway, respectively. A server routes the communications data using a programmable microprocessor having an IP telephony switch and an OOP interface, such as Java-based interface, for managing the communications data.

The OOP router is configurable for use in various applications including system administration, office administration, personal communications management, and service provider administration of subscribers. For more information regarding example applications to which the present invention applies, reference may be made to "8x8 Intraswitch Synthesis of Form," which is provided in the underlying patent document and fully incorporated herein by reference.

Two or more user-defined telephony devices and a user interface are also coupled to the communications link. The user interface is adapted to provide programming data to the server, such as telephony communications configuration data, for controlling the server. For example, a user interface including an Internet web page can be used to couple to the server and select IP telephony options, such as call waiting, telephone extension assignment, call forwarding, or other communication-related controls. The server uses the configuration data from the user interface in combination with core configuration data programmed at the server to control IP telephony switching functions and call-control functions for the user-defined telephony devices.

In this manner, the computer server acts as an IP-private branch exchange (IP-PBX), and makes it possible for service providers to offer a full, dedicated IP-PBX system. The network can be used to enhance or even replace existing traditional telephony PBX networks, and can work in combination with existing networks, such as a LAN in a user facility. By taking advantage of economies inherent in IP architectures, the present invention allows Incumbent Local Exchange Carriers (ILECs) to extend their businesses, and Competitive Local Exchange Carriers (CLECs), Inter Exchange Carriers (IXCs) and Internet Service Providers (ISPs) to provide local telephony services to enterprises at competitive rates. In addition, the present invention can be scaled to support thousands of lines per enterprise, and because it effectively fuses the voice and data networks, it allows the easy integration of computer telephony applications such as call centers, unified messaging and the like.

In one implementation, the routing arrangement includes a receiver for receiving communications signals, such as signals from a LAN, the Internet, or from a PSTN. The received communications signals are processed using the OOP interface, such as a Java telephony application programming interface (JTAPI), and the processing is based on programming selections made for the system. The programming interface uses OOP for interfacing between object code instructions and the microprocessor. An output coupled to the programming interface is adapted to output communications signals in response to the received communications signals.

The routing arrangement can be used to effect various communications. For example, communications data can be routed between internal users (e.g., users connected to a LAN that is also connected to the communications device), and between internal and external users (e.g., users connected to the communications device or the LAN by public communications lines, such as telephone, ISDN, and cable lines). The communications may, for example include traditional voice telephony, voice-response, voice mail, conferencing, facsimile, Internet protocol (IP), screen-based telephony (SBT), Operations, Administration and Maintenance (OA&M), and multimedia communications.

Various aspects of the present invention make the integration of IP telephony switching systems highly adaptable for a multitude of uses and applications. For instance, the computer server, user interface, and user-defined telephony devices can be located anywhere on the network. Since the server is programmed using OOP, it is portable to any platform made by any manufacturer that has OOP capabilities. Multiple IP-PBXs can be run on a single server, thereby greatly reducing the space per IP-PBX ratio. The distributed architecture is particularly advantageous for today's flexible workplaces and supports telecommuters, branch offices and larger organizations. The IP-PBX is self-managed by the customer and interfaces with the CLEC's existing infrastructure, thereby reducing operational costs.

The management of the communications network is enhanced by the ability to provide different security access levels to control the IP telephony options. In one implementation, individual end-users are given access to control the individual's telephony options, such as voice mail, ring-type, call-forwarding, and other options. In applications using confidential communications, the end-user is provided with the only access for particular telephony options, such as voicemail retrieval. In another implementation, local administrators controlling one or more user facilities are given higher security level access for controlling the IP telephony network features on a larger scale, such as telephone assignment, voicemail data storage, password security, and other options. On a larger scale, a service provider for the system is given security clearance to control global functions of the system, such as the number of telephony links allocated to a user, or billing for telephony communications.

FIG. 1 is a communications network, according to a more specific example embodiment of the present invention. A service provider 110 is adapted to control and route communications data for a user premise 120. User premise 120 includes a variety of communications devices including an IP phone 122, computers 124 and 126, and two telephones 132 and 134 coupled to an IP gateway 130. Each of the devices is communicatively coupled to the service provider via a router 140 and a communications link 150. The service provider is adapted to send and receive communications data via a router 160 coupled to the communications link 150. The router 160 is coupled to the Internet, to a server 170 and an IP/PSTN gateway 180. The router 160 is adapted to route communications to either the router 140, the Internet, the server or the gateway 180.

The server 170 is programmed to control the routing of communications data to and from the user premise 120. The programming is accomplished in various manners, depending upon the functions being programmed and the security access level of the programming source. First, individual users at the customer premise can program the server. Each user programs various communications selections, such as those described hereinabove. Inputs from the computers 124 and 126, from the IP telephone 122, or from the telephones 132 and 134 are all used for controlling the server. The computers have a user interface adapted to provide various communications selections to the server. The user interface may include, for example, the graphical user interface described in U.S. patent application Ser. No. 09/597,704, filed on Jun. 16, 2000 and entitled "Communications Controller and Method Therefor." Selections are made at the computer interface for controlling communications between the computer and one or more other communications devices. Similarly, the IP telephone 122 and other telephones 132 and 134 are used to input control information, such as via a touch-tone sequence or other control code entry.

In addition to programming the server at the user premise 120, the server may also be programmed at remote locations, such as at a communications device communicatively coupled to the Internet or to the PSTN. As discussed in connection with communications devices located the user premise, various control inputs are provided to the server via the respective connections using remote communications devices. For example, Internet communications devices such as a computer, a wireless telephone having Internet communications ability, or an Internet interface such as a WebTV interface could all be adapted for use in communicating with the server to provide programming information.

Figure 2:
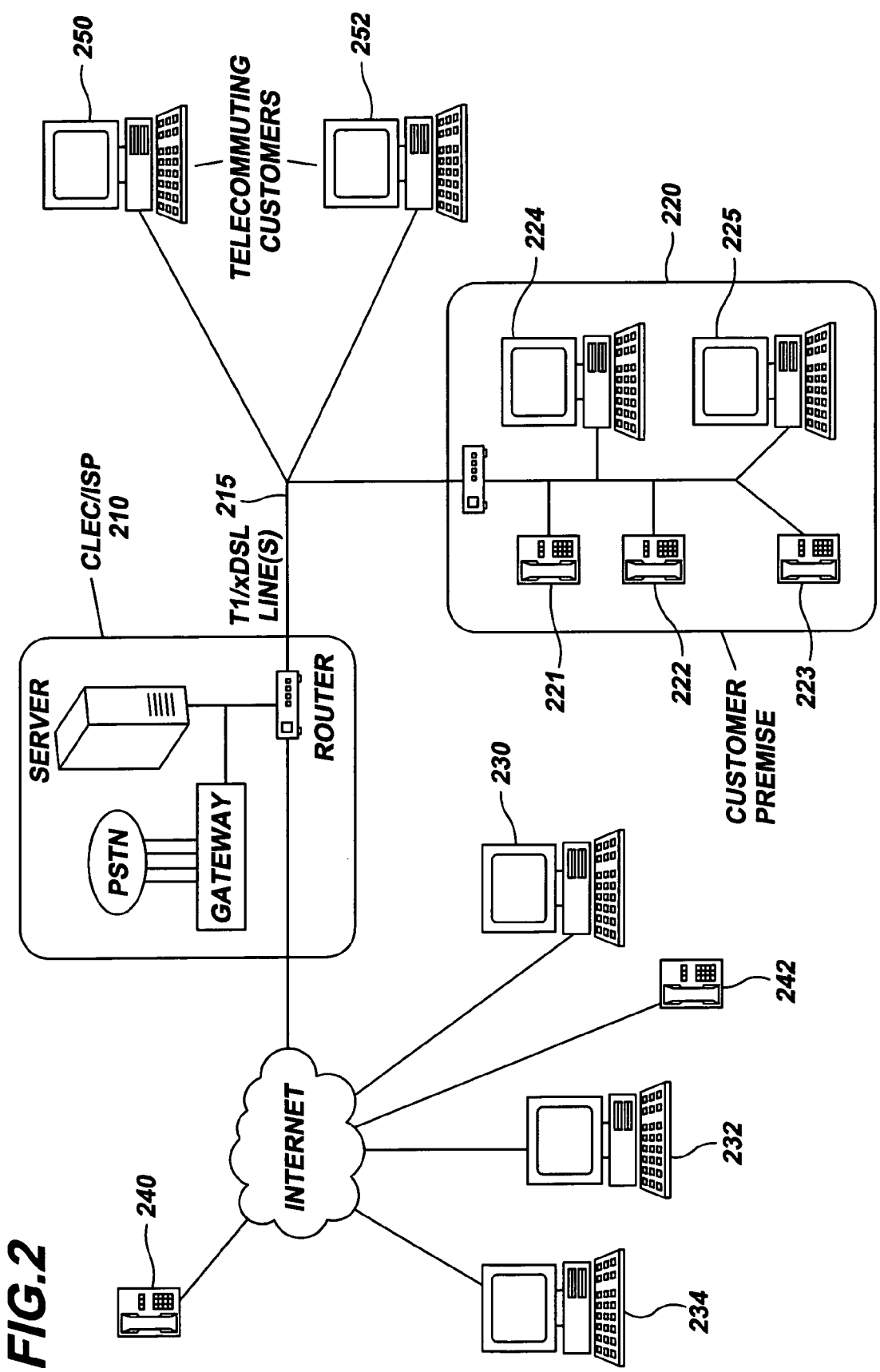
FIG. 2 is another telephone network, according to another example embodiment of the present invention.

FIG. 2 is another communications network, according to another example embodiment of the present invention. Service provider 210 and customer premise 220 are implemented in a manner similar to that discussed in connection with FIG. 1. In addition, various communication devices are connected to the service provider via the Internet. These communications devices include computers 230, 232 and 234, and IP telephones 240 and 242. Telecommuting customers connect to the service provider via a local connection, such as a T1, PSTN or DSL communication link 215. Computers 250 and 252 are communicatively connected in this manner.

In one example embodiment of the present invention, the service provider 210 is a local telephone/Internet service provider. In this instance, the customer premise and the telecommuting customers are communicatively coupled to the local service provider via local communications links. The telecommuting customers could alternatively couple to the service provider via the Internet. Effectively, this enables the telecommuting customers to function as if they were at the customer premise 220. For example, a user who normally works at the customer premise and communicates via telephone 221 can decide to stay home and work, or work remotely using a laptop computer coupled to the Internet while traveling. The off-premise customer contacts the service provider via one of the communications links and sends programming information that includes the reassignment of a telephone number that was assigned to the telephone 221. The reassignment information causes the number to be assigned to a new selected IP address, such as the IP address of the computer 252. When a telephone call is made to the telephone number associated with the telephone 221, the service provider routes that call to the newly-assigned IP address. In a similar manner, a telecommuting customer controls other options, such as voice mail messaging, call forwarding and other options.

Figure 3:
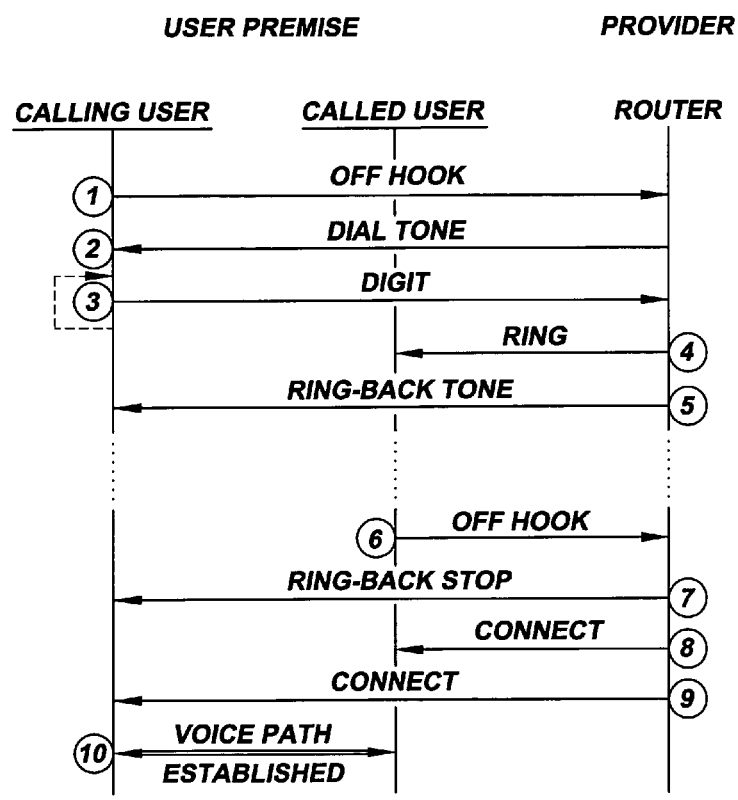
FIG. 3 is a chart showing telephone communication data, according to another example embodiment of the present invention.

Various call control scenarios are adaptable for use in connection with the present invention. FIG. 3 shows one such call scenario wherein a call is made within a user premise, such as those shown by way of example in FIGS. 1 and 2. At step 1, a calling user initiates a telephone call, such as by picking up a receiver or initiating a call using a computer. An off-hook signal is sent to a router at step 2, and the router sends a dial tone back to the calling user. The calling user then dials a series of digits at step 3, the digits being indicative of a called user located within a user premise. At step 4, a ring signal is sent to the called user, and a ring-back tone is sent to the calling user at step 5. When the called user answers, an off-hook signal is sent to the router at step 6, and the router responds with a ring-back stop at step 7. A connect signal is sent to the called user at step 8, and to the calling user at step 9. Once each user receives the connect signal, a voice path is established directly between the calling user and the called user at step 10.

Figure 4:
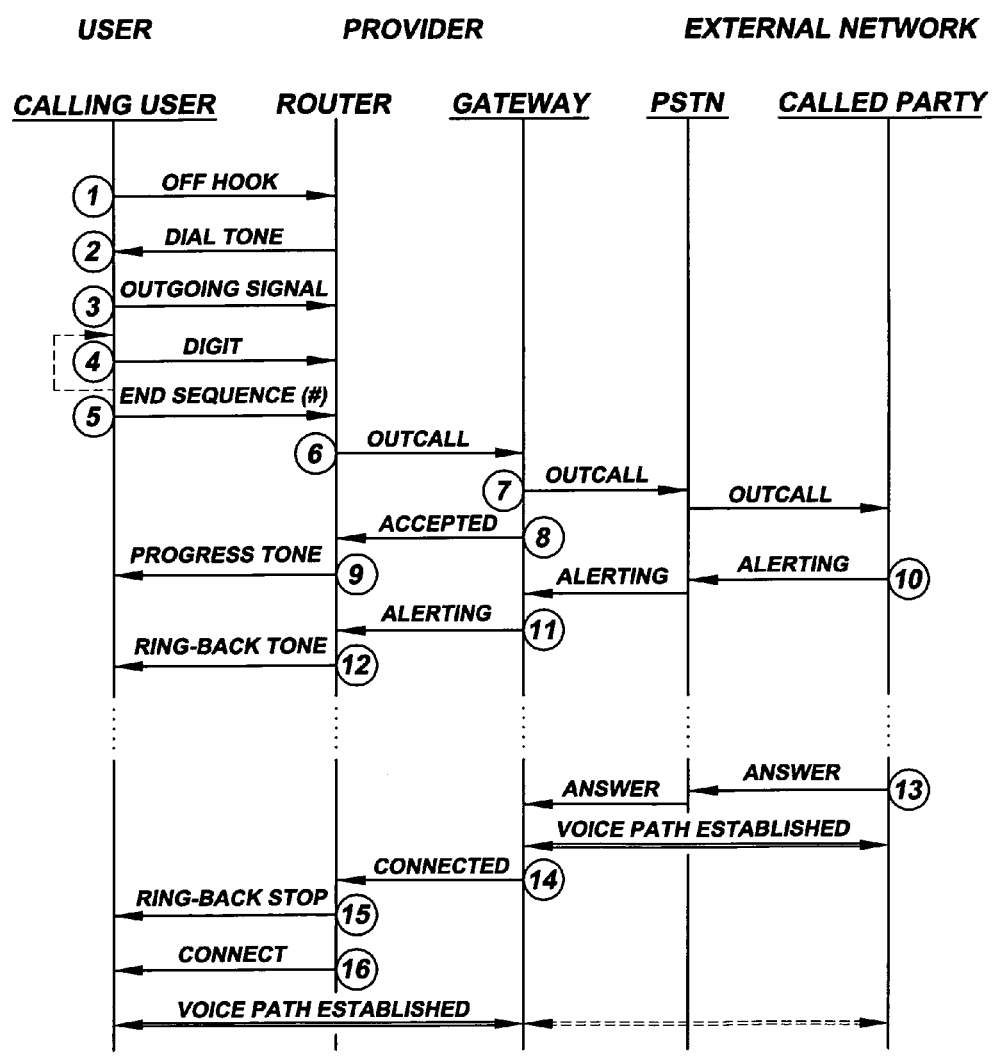
FIG. 4 is another chart showing telephone communication data, according to another example embodiment of the present invention.

FIG. 4 shows one such call scenario wherein a call is made between a user premise and an outside party in an external network, such as those shown by way of example in FIGS. 1 and 2. At step 1, and off-hook signal is sent to the router as a result of the user initiating a telephone call, and a dial tone is sent to the user from the router in response at step 2. At step 3, the calling user then sends a signal to the router that indicates that the call is to go to an outside party, such as the digit "9" or some other signal, such as a click on a selected icon on a computer telephony application. Once the outgoing call signal is sent, the user enters a telephone number to be called at step 4 using digits or some other communication. Once the number has been entered, and end of sequence indicator is sent at step 5, such as a pound "#" digit on a telephone. The router then sends the outcall information to a gateway at step 6, and the gateway relays the outcall information to a PSTN at step 7, which then sends the signal to a called party. In the meantime, an "accepted" signal is sent from the gateway to the router at step 8, and a progress tone is sent from the router to the calling user at step 9. Once the telephony device at the called party receives the outcall signal, it returns an alert to the gateway via the PSTN at step 10. In response, the gateway sends an alert to the router at step 11, and the router sends a ring-back tone to the calling user at step 12. When the called party answers the call at step 13, an answer signal is sent to the gateway via the PSTN from the called party, and a voice path is established between the gateway and the called user. The gateway sends a connected signal to the router at step 14, and the router sends both ring-back stop and connect signals to the calling user at steps 15 and 16, respectively. A voice path is then established between the calling user and the gateway, and ultimately between the calling user and the called user.

Other example embodiments of the present invention include one or more aspects of the other patent documents mentioned herein.

While the present invention has been described with reference to several particular example embodiments, those skilled in the art will recognize that many changes may be made thereto without departing from the spirit and scope of the present invention, which is set forth in the following claims.

What is claimed is:

1. A telephony private branch exchange routing arrangement adapted to route IP telephony data, the routing arrangement comprising:
   a call-control application having an object-oriented programming (OOP) telephony interface and programmed, using OOP and the OOP telephony interface, to control the routing of calls;
   a device-control application adapted to provide telephony communication signals for the routed calls and to interface between the call-control application and a plurality of telephony devices; and
   a configuration manager adapted to provide configuration information for the call-control application and the device-control application.

2. The routing arrangement of claim 1, wherein the configuration manager is further adapted to provide configuration information for a telephony device communicatively coupled to the routing arrangement.

3. The routing arrangement of claim 1, wherein the OOP interface of the call-control application includes a Java telephony application programming interface (JTAPI).

4. The routing arrangement of claim 3, wherein the JTAPI is adapted to interface with both local and remote applications.

5. The routing arrangement of claim 1, wherein the call-control application further includes a phonelet adapted to interface between the routing arrangement and a telephone user for controlling call routing to the user.

6. The routing arrangement of claim 5, wherein the phonelet is programmed with a selected access level to the routing arrangement.

7. The routing arrangement of claim 1, wherein the call-control application is adapted to couple to and route calls via an Internet protocol gateway.

8. The routing arrangement of claim 1, wherein the call-control application further comprises a phone configuration application adapted to communicate telephony device configuration selections between a user and the routing arrangement.

9. The routing arrangement of claim 8, wherein the phone configuration application is further adapted to monitor active calls.

10. The routing arrangement of claim 8, wherein the phone configuration application is adapted to communicate telephony device configuration via an Internet browser.

11. The routing arrangement of claim 1, wherein the call-control application includes an administration call monitor application adapted to provide real-time call monitoring to an administrator via a user interface.

12. The routing arrangement of claim 1, wherein the device control application is adapted to use JTAPI to communicate with the call control application.

13. The routing arrangement of claim 1, wherein the device control application includes a media development kit adapted to convert between logical data that the call-control application uses and telephony data that the plurality of telephony devices use.

14. The routing arrangement of claim 13, wherein the device control application includes at least one protocol handler communicatively coupled to the media development kit via a media device application protocol interface (MDAPI) and is adapted to provide an interface between the media development kit and external hardware equipment controlled by the routing arrangement.

15. The routing arrangement of claim 14, wherein the external hardware equipment includes at least one of: an IP analog telephone interface, and IP digital telephone interface, a SIP gateway and an H323 gateway.

16. The routing arrangement of claim 1, wherein the device-control application is adapted to provide telephony communication signals including at least one of: DTMF tone, dial tone, off hook, ring, ring-back, ring-back stop, connect, hang-up, delete connection, call-waiting, alert and digit signals.

17. The routing arrangement of claim 1, wherein the configuration manager is further adapted to edit the configuration information in response to a user request.

18. The routing arrangement of claim 17, wherein the configuration manager is programmed to permit user editing based upon an access code provided by the user, wherein the level of editing permitted is based upon the security level associated with the user access code.

19. The routing arrangement of claim 1, wherein the configuration manager is adapted to store configuration data.

20. The routing arrangement of claim 19, wherein the stored configuration data is stored in the form of enterprise java beans (EJB).

21. The routing arrangement of claim 1, wherein the configuration manager includes an extensible markup language (XML) arrangement adapted to transfer structured information data to a user, the call-control application and the device-control application, the data including content and an indicator of the role the content plays.

22. The routing arrangement of claim 1, wherein the configuration manager further includes a servlet adapted to interface with an Internet browser for editing the configuration information.

23. A programmable communications network for communicatively coupling telephony stations, the network comprising:
a plurality of communications stations communicatively coupled to each other, at least one of the plurality of communications stations being adapted to communicate call-method configuration data; and
a computer server arrangement coupled to the communications stations and comprising:
core configuration data;
a call-control application programmed, using an object-oriented programming (OOP) interface, with the call-method configuration data in combination with the core configuration data; and
an IP telephony switch communicatively coupled to the communications stations and responsive to the programmed call-control application, for coordinating communication between selected ones of the communications stations.

24. The network of claim 23, wherein at least one of the plurality of communications stations includes a user interface.

25. The network of claim 23, wherein the plurality of communications stations includes at least one of: an analog telephone coupled to an analog-to-IP converter; a wireless station, an Internet interface station, a computer, an IP phone and a videoconferencing device.

26. The network of claim 23, wherein the call control application is configured using a combination of internal OOP program instructions and OOP program instructions received from an external source.

27. The network of claim 23, wherein OOP program instructions are provided by a user at one of the plurality of communications stations.

28. The network of claim 23, wherein the telephony data includes at least one of: voice data, image data and communications control data.

29. The network of claim 23, further comprising:
a telephony service providing arrangement adapted to use the computer server arrangement to receive data including telephony data and to rout the data as IP telephony data; and
a communications line coupled to the service provider and adapted to communicate the IP telephony data.

30. The network of claim 23, wherein the computer server arrangement is adapted to monitor the locations of the communications stations and, based on the locations, to assign a telephony communications rate for charging a user at one of the plurality of communications stations for the communicative coupling.

31. The network of claim 30, wherein the computer server arrangement is further adapted to generate data representing the monitored locations and a communication between stations and, based on the generated data, assign a fee for the communication.

32. The network of claim 23, wherein the communications stations are communicatively coupled via at least one of: a PSTN, the Internet, a LAN, a wireless link, coaxial cable, a T1 link, a T3 link and a DSL link.

33. A telephony private branch exchange routing arrangement adapted to route IP telephony data, the routing arrangement comprising:
means for controlling telephony calls and including an object-oriented programming (OOP) telephony interface and programmed, using OOP and the OOP telephony interface, to control the routing of calls;
means for device control adapted to provide telephony communication signals for the routed calls and to interface between the means for controlling telephony calls and a plurality of telephony devices; and
means for configuration managing adapted to provide configuration information for the call-control application and the device-control application.

34. A method for providing telephony communications, the method comprising:
providing a configurable IP telephony router communicatively coupled to a communications network and adapted to communicate telephony data;

providing configuration information to the telephony router and controlling the router therefrom;

sending telephony data to the router via the communications network and receiving the telephony data at the router; and using the provided configuration information to route telephony data via the router.

35. The method of claim 34, wherein providing a configurable IP telephony router includes providing:

a call-control application having an OOP telephony interface and programmed, using OOP and the OOP telephony interface, to control the routing of telephone calls;

a device-control application adapted to provide telephony communication signals for the routed calls and to interface between the call-control application and a plurality of telephony devices; and a configuration manager adapted to provide configuration information for the call-control application and the device-control application.

36. The method of claim 34, wherein providing a configurable IP telephony router includes providing a router adapted to be used at a telephone service provider for controlling telephone calls to a plurality of subscribers.

37. The method of claim 34, wherein providing configuration information includes assigning a telephone number to a selected IP telephony address.

38. The method of claim 34, wherein providing configuration information includes providing call control configuration information for controlling at least one of: call forwarding, voicemail, call conferencing, video, display options, call waiting, caller ID and call blocking.

39. The method of claim 34, further comprising prompting a user for an input, and wherein providing configuration information includes providing information in response to the prompt.

40. The method of claim 34, wherein sending telephony data includes sending telephone call control data for controlling the routing of a least one telephone call.

41. The method of claim 34, wherein sending telephony data includes sending communications including at least one of: voice data, image data and video data.

42. The method of claim 34, wherein using the provided configuration information to route telephony data includes at least one of: routing telephony data within a user premise, routing telephony data to a plurality of premises, routing telephony data via the Internet, and routing telephony data via a PSTN.

43. The method of claim 34, further comprising:

determining a relationship between a call source and a call destination;

correlating the determined relationship to a selected one of a group of pre-determined relationships, each pre-determined relationship having a pre-selected telephony rate application; and applying the telephony rate to the communication.

44. The method of claim 43, wherein the rate is based on a relationship including at least one of: the time that the call takes place, the location of sender/receiver, the amount of information sent, the duration of the call, a selected security level and a selected encryption level.

* * * * *

UNITED STATES PATENT AND TRADEMARK OFFICE
CERTIFICATE OF CORRECTION

PATENT NO. : 7,035,935 B1
APPLICATION NO. : 09/880706
DATED : April 25, 2006
INVENTOR(S) : Voois et al.

Page 1 of 1

It is certified that error appears in the above-identified patent and that said Letters Patent is hereby corrected as shown below:

<u>In the Claims</u>

Col. 10, line 28, Claim 29: "rout" should read --route--.

Col. 12, line 7, Claim 40: "of a least" should read --of at least--.

Signed and Sealed this

Twenty-second Day of July, 2008

JON W. DUDAS
*Director of the United States Patent and Trademark Office*